(12) United States Patent
Bornemann et al.

(10) Patent No.: US 11,131,574 B2
(45) Date of Patent: Sep. 28, 2021

(54) POT MAGNET FOR A MOVING COIL ARRANGEMENT IN AN ELECTRONIC BALANCE

(71) Applicant: SARTORIUS LAB INSTRUMENTS GMBH & CO. KG, Goettingen (DE)

(72) Inventors: Lars Bornemann, Rosdorf (DE); Michael Mueller, Goettingen (DE); Christian Schrader, Bodenfelde (DE); Friedrich Helmsen, Goettingen (DE); Jonas Bode, Goettingen (DE); Tanja Mueck, Langelsheim (DE)

(73) Assignee: SARTORIUS LAB INSTRUMENTS GMBH & CO., KG, Goettingen (DE)

( * ) Notice: Subject to any disclaimer, the term of this patent is extended or adjusted under 35 U.S.C. 154(b) by 168 days.

(21) Appl. No.: 16/673,054

(22) Filed: Nov. 4, 2019

(65) Prior Publication Data
US 2020/0064178 A1    Feb. 27, 2020

Related U.S. Application Data

(63) Continuation of application No. PCT/EP2018/061794, filed on May 8, 2018.

(30) Foreign Application Priority Data

May 19, 2017    (DE) ..................... 10 2017 110 930.7

(51) Int. Cl.
  *G01G 7/02*    (2006.01)
(52) U.S. Cl.
  CPC ...................................... *G01G 7/02* (2013.01)
(58) Field of Classification Search
  CPC ....................................................... G01G 7/02
  See application file for complete search history.

(56) References Cited

U.S. PATENT DOCUMENTS 4,168,756 A * 9/1979 Enzmann .................. G01G 7/04
                                                              177/210 EM
4,429,757 A * 2/1984 Kunz ....................... G01G 7/04
                                                              177/210 EM (Continued)

FOREIGN PATENT DOCUMENTS

DE    102010013764 B4    8/2012
EP          1770380 A2    4/2007

(Continued)

OTHER PUBLICATIONS

International Search Report, PCT/EP2018/061794, dated Sep. 27, 2018, 4 pages.

(Continued)

*Primary Examiner* — Natalie Huls
(74) *Attorney, Agent, or Firm* — Edell, Shapiro & Finnan LLC

(57) ABSTRACT

A pot magnet (20) for a moving coil (10) of an electronic balance operating using the electromagnetic compensation principle includes: —a pot base (24) and a pot wall (22) rising vertically from the pot base, and —a permanent magnet structure (26) disposed within the pot wall and having an annular gap thereto, which structure has a permanent magnet body (261) arranged on the pot base side and a pole plate (262) connected to the surface thereof facing away from the pot base side. The pole plate is fixed by a rigid mechanical connection independent of the permanent magnet body to the pot base at a predetermined distance therefrom and the permanent magnet body is bonded to the pole plate on a surface facing the pot base without contacting the pot base.

8 Claims, 2 Drawing Sheets

(56) References Cited

U.S. PATENT DOCUMENTS

| | | | | |
|---|---|---|---|---|
| 4,699,228 A | * | 10/1987 | Mustarelli | G01G 7/04 |
| | | | | 177/210 EM |
| 5,174,401 A | * | 12/1992 | Kunz | G01G 7/02 |
| | | | | 177/212 |
| 5,856,638 A | * | 1/1999 | Burkhard | G01G 7/02 |
| | | | | 177/210 EM |
| 2017/0153140 A1 | * | 6/2017 | Reber | G01G 23/01 |

FOREIGN PATENT DOCUMENTS

| | | |
|---|---|---|
| JP | H0989637 A | 4/1997 |
| JP | 3691607 B2 | 9/2005 |
| JP | 2006138665 A | 6/2006 |
| JP | 2006189330 A | 7/2006 |

OTHER PUBLICATIONS

International Preliminary Report on Patentability, and Written Opinion, PCT/EP2018/061794, dated Nov. 19, 2019, 5 pages.

* cited by examiner

POT MAGNET FOR A MOVING COIL ARRANGEMENT IN AN ELECTRONIC BALANCE

CROSS REFERENCE TO RELATED APPLICATIONS

This is a Continuation of International Application PCT/EP2018/061794, which has an international filing date of May 8, 2018, and which claims the priority of German Patent Application 10 2017 110 930.7, filed May 19, 2017. The disclosures of both applications are incorporated in their respective entireties into the present Continuation by reference.

FIELD OF THE INVENTION

The invention relates to a pot magnet for a moving coil arrangement of an electronic balance working on the principle of electromagnetic compensation, said pot magnet comprising
 a pot base and a pot wall rising vertically from the pot base, and
 a permanent magnet structure, disposed within the pot wall and having an annular gap to the pot wall, which permanent magnet structure comprises a permanent magnet body, arranged on the pot base side, and a pole plate, connected to that surface of the permanent magnet body that faces away from the pot base.

BACKGROUND

A moving coil arrangement with such a pot magnet is known from DE 10 2010 013 764 B4. Although the document does not explicitly mention a use of the moving coil arrangement, disclosed therein, for an electronic balance working on the principle of electromagnetic compensation, the disclosed moving coil arrangement corresponds to the type that is usually used in electronic balances.

Electronic balances, so-called EMF balances, which operate on the principle of electromagnetic compensation, have been known to the person skilled in the art for a long time. The operating principle of such electronic balances is based on the fact that a deflection of a lever system, loaded with a weight to be weighed, is prevented by energizing the coil of a moving coil arrangement, which is connected to the lever system, in a compensating manner, so that the weight of the object and the electromagnetic force, both of which act on the lever system, cancel each other. The coil current, which is required for this purpose and is also referred to as a measuring current, serves as a measure for the required compensation force and, therefore, for the weight of the object to be weighed.

The moving coil arrangement consists of the moving coil, which is usually hinged to the lever system, and the pot magnet, which is usually fixed to a fixed base, which is movably mounted with respect to the lever system. The pot magnet comprises the actual pot and a permanent magnet structure disposed in the pot, wherein the pot serves as a magnetic yoke for the permanent magnet structure. The permanent magnet structure is typically constructed of a permanent magnet body of permanent magnetic material and a so-called pole plate. The pole plate is used to homogenize the magnetic field and is typically made of a non-permanent magnetic, ferromagnetic material. The aforementioned document discloses the typical structure of such a pot magnet, wherein the permanent magnet body is disposed directly on the pot base; and the pole plate is disposed on that surface of the permanent magnet body that faces away from the pot base.

The connection between the pot base and the permanent magnet body, on the one hand, and the permanent body and the pole plate, on the other hand, the details of which are not given in this document, is typically achieved by two adhesions to the interfaces. This aspect may be problematic with precision balances. Just the slightest change in the position of the pole plate relative to the moving coil surrounding it results in a change in the electromagnetic interaction and, therefore, to a change in the compensation force acting on the lever system. Thus, a change in the position of the pole plate influences the measurement result. Experience teaches that all of the commercially available adhesives that are suitable for bonding between the permanent magnet body and the pot base, on the one hand, and the permanent magnet body and the pole plate, on the other hand, tend to absorb moisture from the air and correspondingly tend to swell. Therefore, the width of the adhesive gaps depends significantly on the ambient humidity. In the case of the known structure of a pot magnet the changes in the width of the two adhesive gaps add up to a change in the position of the pole plate relative to the pot base. This aspect leads, as explained above, to a moisture-dependent effect on the measurement result. This is unacceptable for precision measurements.

A comparable pot magnet is known from JP H09-89 637 A, where the pole plate and the permanent magnet body are fixed strictly mechanically on the pot base explicitly without the use of adhesive. This is achieved with a central through-hole through the pole plate and the permanent magnet body, through which a bolt, which is made of a non-magnetic material, is screwed into a central threaded hole in the pot base. Both the drilling of the magnet material, which is often very brittle, and the fixing compression of this material when tightening the bolt, involve a considerable risk of damage.

A moving coil arrangement is known from JP 2006-189 330 A, where the position of the moving coil relative to the permanent magnet structure is adjustable, without thereby having affected the position of the lever system. Although this arrangement is theoretically suitable for solving the aforementioned problem, it has not been effective in practice, because, on the one hand, the tiny changes in the position of the pole plate due to the manual adjustment cannot be corrected with sufficient accuracy. In addition, it is unsuitable in practice to make such a delicate adjustment before each weighing. However, this would be necessary, because of the explained impact of the constantly changing ambient humidity in order to ensure a consistent quality of the measurement. In addition, the inventors have recognized another source of error associated with the swelling of the adhesive gaps. Thus, even in the event that the relative positioning of the pole plate and the moving coil is not changed, the strength of the magnetic field passing through the magnetic coil depends on the sum of the widths of the gaps between the permanent magnet body and the pot base, on the one hand, and the permanent magnet body and the pole plate, on the other hand. This impact on the effective magnetic field strength cannot be eliminated by the aforementioned adjustment option.

SUMMARY

An object of the present invention is to further develop a generic pot magnet in such a manner that the reproducibility of the weighing results of EMF balances, the moving coil arrangement of which includes such a pot magnet, is improved, in particular, with respect to the effects caused by changes in the humidity.

This and other objects are achieved, according to one formulation, by a configuration in which the pole plate is fixed by a rigid mechanical connection, independent of the permanent magnet body, to the pot base at a predetermined distance from the pot base and in which the permanent magnet body is glued to the pot base-sided surface of the pole plate without contact to the pot base.

In contrast with the prior art, the positioning of the pole plate does not occur directly, i.e., through a direct connection with, the permanent magnet body, but rather independently thereof via its own rigid connection to the pot base, which will be explained below with reference to concrete exemplary embodiments. Thus, the distance of the pole plate from the pot base is absolutely fixed. In particular, the rigid mechanical connection of the present invention is independent of the changes in humidity. Hence, in the context of a moving coil arrangement, the moving coil can be arranged in a permanently constant, relative positioning to the pole plate without the need for a special adjustment device for this purpose. As a result, the aforementioned first source of error, i.e., the lack of positional stability of the pole plate, is eliminated.

In addition, the invention also eliminates the aforementioned second source of error, i.e., the lack of constancy of the sum of the width of the gaps above and below the permanent magnet body. In accordance with the present invention the permanent magnet body is glued to the pot base-sided surface of the pole plate. However, there is no contact with the pot base itself (aforementioned independence of the pole plates/pot base connection). Instead, a gap, which is typically empty or alternatively is filled with ambient air, remains between the pot base-sided surface of the permanent magnet body and the pot base. Above and below the permanent magnet body there are still gaps, of which, however, the gap between the permanent magnet body and the pole plate is designed as an adhesive gap; and the gap between the permanent magnet body and the pot base is designed as an air gap. Swelling of the adhesive gap leads to a corresponding decrease in the air gap, so that the sum of the gap widths, the variation of which the inventors have recognized as a second source of error, remains constant. Therefore, the invention also eliminates the aforementioned second source of error in this way.

Therefore, the use of the inventive pot magnet in a moving coil arrangement of an EMF balance results in a significantly improved independence of the measurement results from the ambient humidity.

In a preferred embodiment of the invention it is provided that the mechanical connection between the pole plate and the pot base comprises a bolt that passes through the permanent body without contact, with the first end of the bolt connected to the pot base and with the second end of the bolt connected to the pole plate. Thus, this rigid connecting bolt defines the distance between the pole plate and the pot base and, as a result, the position of the pole plate relative to the pot base in a humidity-independent manner.

The bolt can be designed in different ways. In a first embodiment it is provided that the bolt is designed as a threaded bolt having one external thread each on its two ends. The first end of the threaded bolt is screwed into a corresponding internal thread of the pot base; and the second end of the threaded bolt is screwed into a corresponding internal thread of the pole plate. In order to define exactly the distance between the pole plate and the pot base, the threaded bolt comprises a radially thickened region, which is bounded on both sides by an axially effective stop flange, preferably between the external threads of the threaded bolt. Hence, the threaded bolt can be screwed into the internal thread of the pot base as far as up to the pot base-sided stop flange of the threaded bolt. Then, the pole plate can be screwed with its internal thread as far as up to the pole plate-sided stop flange, in particular, in the case of a centric arrangement of the threaded bolt. With suitable tightening force it is possible to achieve a permanently stable connection. Of course, it is also possible to use additional measures that are intended for fixing the screwed connection and that are known to those skilled in the art.

In an alternative embodiment it is provided that the bolt is designed as a screw that passes through the pot base and is supported by a screw head, disposed on the first end of the screw, against the outer surface of the screw head. The threaded second end of the screw is screwed into a corresponding internal thread of the pole plate. The screw-in depth into the internal thread of the pole plate, which determines the position of the pole plate relative to the pot base, can be specified exactly in different ways. In a preferred embodiment it is provided that the screw is a hollow cylindrical spacer sleeve that passes through the permanent magnet body without contact and is supported by its first end against the pot base and by its second end against the pole plate. The end faces of the spacer sleeve provide in each case an abutment surface for the pot base or the pole plate, so that the axial length of the spacer sleeve defines their distance. Owing to the screw connection, the pole plate is pulled against the spacer sleeve and, in so doing, is pulled indirectly against the pot base. In this embodiment the spacer sleeve envelops the screw directly and in turn is encompassed by the permanent magnet body, through which it passes. In order to generate other supporting points further away from each other and, in so doing, generate an improved stability, it can also be provided that the spacer sleeve radially surrounds the outside of the permanent magnet body, through which the screw passes. Then the spacer sleeve has a correspondingly larger diameter and consequently forms a more stable support between the pot base and the pole plate.

In another embodiment there are provided a plurality of eccentrically arranged spacer pins that pass through the permanent magnet body without contact and are supported by their first ends against the pot base and are supported by their second ends against the pole plate. Preferably the spacer pins are connected to the pole plate or to the pot base by welding, soldering, screwing or pinning. The mode of action is essentially the same as that explained above. However, the advantage lies—at least in comparison to a spacer sleeve of small diameter—in the wider abutment surface and, as a result, in greater security that the pole plate will not tilt relative to the pot base. On the other hand, the spacer sleeve variant avoids any non-rotationally symmetrical structures, an aspect that benefits the homogeneity of the magnetic field. In both cases a tightening of the screw with a suitable tightening force results in a permanent fixation; and, of course, those measures that are intended for securing a screwed connection and that are known to those skilled in the art may also be used.

The person skilled in the art will understand that the aforementioned variants with spacer sleeves and/or spacer pins are not limited to embodiments of the bolt as a screw. Embodiments as threaded bolts that are provided with threads on both ends can be readily combined with these types of distance fixation.

Other features and advantages of the invention will become apparent from the following specific description and the drawings.

DETAILED DESCRIPTION

Figure 1:
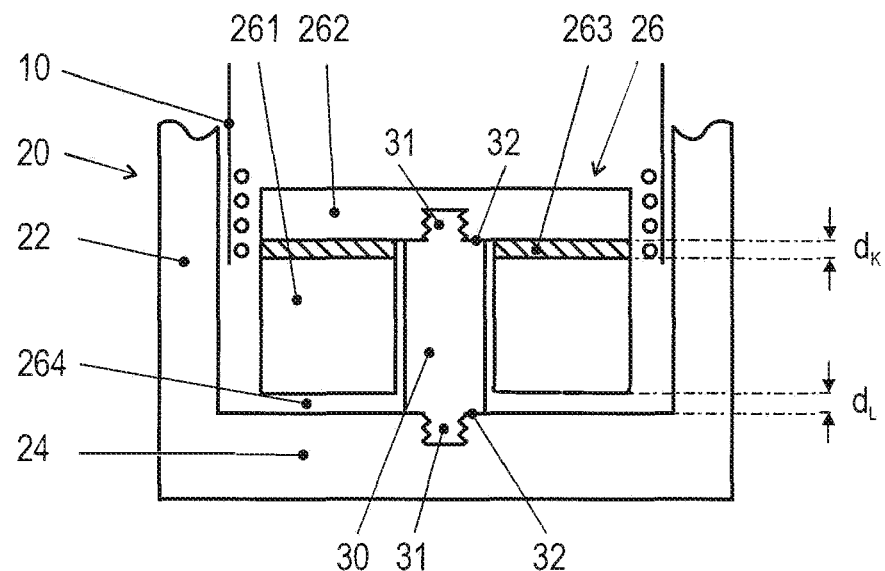
FIG. 1: a moving coil arrangement with a first embodiment of a pot magnet in accordance with the invention.

Identical reference numerals in the figures indicate the same or analogous elements.

Figure 2:
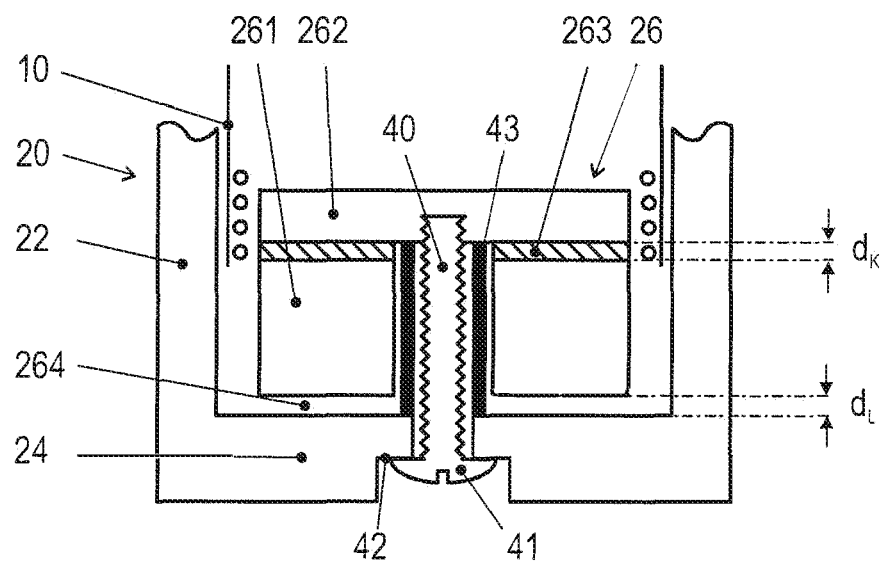
FIG. 2: a moving coil arrangement with a second embodiment of a pot magnet in accordance with the invention.
Figure 3:
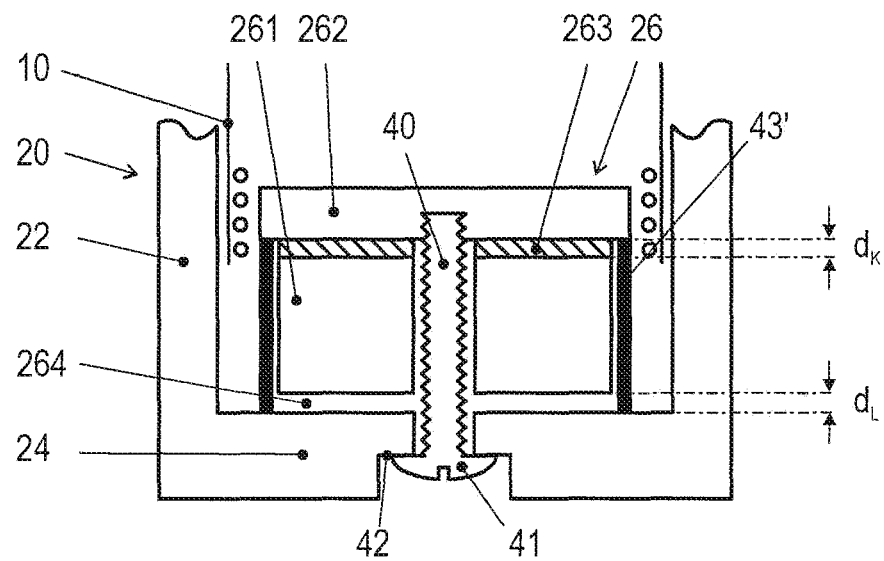
FIG. 3: a moving coil arrangement with a third embodiment of a pot magnet in accordance with the invention.

FIGS. 1 to 3 show in each case a moving coil arrangement that is suitable, in particular, for the sensor system of a precision balance working on the principle of the electromagnetic compensation.

In this respect the moving coil arrangement comprises a moving coil 10 and a pot magnet 20. In the assembly end position the moving coil 10 is attached to a lever arm (not shown) of a weighing system and immersed in the magnetic field of the pot magnet 20, as shown by a rough sketch in schematic form in the figures.

The pot magnet 20 comprises a hollow cylindrical pot wall 22, which rises from a pot base 24. Concentric within the pot wall 22 there is a permanent magnet structure 26 that consists essentially of a permanent magnet body 261 and a pole plate 262. The permanent magnet body 261 has a substantially cylindrical shape. The pole plate 262 is formed in a substantially circular disk shape. The permanent magnet body 261 and the pole plate 262 are glued together with an adhesive layer 263. In this case the adhesive layer 263 is located between the lower, i.e., the surface of the pole plate 262 that faces the pot base, and the upper, i.e., the surface of the permanent magnet body 261 that faces away from the pot base. The pole plate 262 is fixed at a predetermined distance from the pot base 24 by a fastener, described in more detail below. This distance is chosen in such a way that a small air gap 264 remains between the lower surface of the permanent magnet body 261 and the pot base.

Depending on the humidity of the surrounding air, the adhesive layer 263 may swell or shrink, as a result of which its layer thickness $d_K$ changes accordingly. Due to the fixing of the distance of the pole plate 262, this leads to a change in the gap thickness $d_L$ of the air gap 264, where this change in the gap thickness is the same in size in each case, but inversely oriented. Thus, the sum of the adhesive layer thickness $d_K$ and the air gap thickness $d_L$ always remains constant, independently of the actual humidity at that instant. Similarly, due to the fixing of the distance of the pole plate 262, its position also always remains constant. Thus, the two most important sources of error for the strength of the magnetic field at the location of the moving coil 10 are eliminated.

FIGS. 1 to 4 show three different embodiments for fixing the distance of the pole plate 262, where each embodiment can be used individually or in combination with one other.

In the embodiment from FIG. 1, a threaded bolt 30 is provided that bears in each case an external thread in each of its two ends 31. Between its ends 31 the bolt 30 is formed substantially cylindrical, with its diameter in this case projecting beyond the diameter of its ends 31, so that a shoulder-like, axially effective abutment flange 32 is formed at the two transitions between the thickened central region and the ends 31. With its lower end 31 the bolt 30 is screwed into a corresponding internal thread in the center of the pot base as far as up to the associated abutment flange. The permanent magnet body 261 has a central recess, so that the entire permanent magnet structure 26 can be placed over the bolt 30; and a central internal thread of the pole plate 262 can be screwed onto the upper end 31 of the bolt 30 and, in particular, as far as up to the corresponding abutment flange 32. The central recess in the permanent magnet body 261 is chosen so large that it does not make contact with the thickened region of the bolt 30.

In the embodiment from FIG. 2, a screw 40 is provided for fixing the pole plate 262; and the screw passes through the pot base 24 from below and rests with its screw head 41 against a preferably recessed stop seat 42. The screw shank extends through the central recess of the permanent magnet body 261 and allows the permanent magnet structure 26 to be screwed on, as also described above in conjunction with FIG. 1. However, the fixing of the height of the pole plate 262 is achieved with a spacer sleeve 43, which is arranged between the screw shank and the wall of the recess in the permanent magnet body 261. The length of the spacer sleeve defines the distance between the pole plate 262 and the pot base 24. Therefore, in the course of tightening the screw 40, the pole plate 262 is pulled against the spacer sleeve 43, and the spacer sleeve in turn is pulled against the pot base 24. At the same time a mechanical contact between the spacer sleeve 43 and the permanent magnet body 261 is preferably to be avoided.

FIG. 3 shows a similar embodiment, in which, however, the spacer sleeve 43' has a larger diameter and radially surrounds the outside of permanent magnet body 261 without contact. In this embodiment the pole plate 262 protrudes radially outwards beyond the permanent magnet body 261 and, in so doing, provides an abutment flange, which is supported on the edge of the spacer sleeve 43'.

Figure 4:
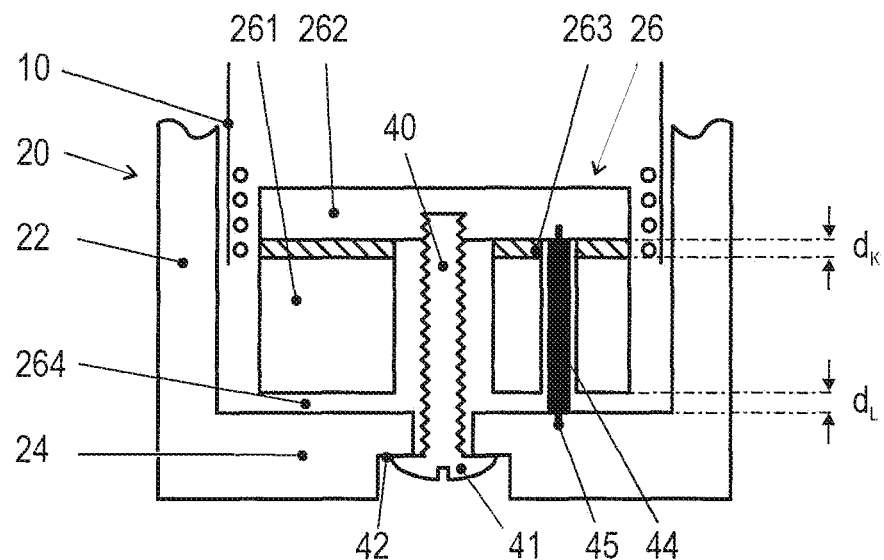
FIG. 4: a moving coil arrangement with a fourth embodiment of a pot magnet in accordance with the invention.

In the embodiment from FIG. 4, a plurality of eccentrically arranged spacer pins 44, of which only one is shown in FIG. 4, are provided, instead of a single spacer sleeve 43, 43'. In the illustrated embodiment each end of the spacer pin 44 has a projection that has a reduced diameter and with which the spacer pin is pre-positioned in a corresponding recess of the pot base 24 or the pole plate 262 respectively. Of course, the permanent magnet body 261 has throughopenings, through which in the assembled state the spacer pins 44 pass, preferably without contact.

LIST OF REFERENCE NUMERALS

10 moving coil
20 pot magnet
22 pot wall
24 pot base
26 permanent magnet structure
261 permanent magnet body
262 pole plate
263 adhesive layer
264 air gap
30 threaded bolt
31 end of 30
32 abutment flange
40 screw
41 screw head 42 stop seat
43, 43' spacer sleeve
44 spacer pin
45 end of 44
$d_K$ adhesive layer thickness
$d_L$ air gap thickness

What is claimed is:

1. Pot magnet for a moving coil arrangement of an electronic balance operating on an electromagnetic compensation principle, said pot magnet comprising:

a pot base and a pot wall rising perpendicularly from the pot base, and a permanent magnet structure, disposed within and defining an annular gap to the pot wall, wherein the permanent magnet structure comprises a permanent magnet body arranged on a side of the structure that faces the pot base, and a pole plate connected to a surface of the permanent magnet body that faces away from the pot base, wherein the pole plate is fixed by a rigid mechanical connection, independent of the permanent magnet body, to the pot base at a predetermined distance from the pot base, and wherein the permanent magnet body is glued to the pole plate on a surface of the pole plate that faces the pot base without contact to the pot base.

2. Pot magnet as claimed in claim 1,
wherein the mechanical connection between the pole plate and the pot base comprises a bolt passing through the permanent magnet body without contact to the permanent magnet body and having a first end connected to the pot base and having a second end connected to the pole plate.

3. Pot magnet as claimed in claim 2,
wherein the bolt is formed as a threaded bolt having an external thread on each of two ends of the bolt, wherein the first end is screwed into an internal thread of the pot base corresponding to the external thread on the first end of the bolt, and wherein the second end is screwed into a an internal thread of the pole plate corresponding to the external thread on the second end of the bolt.

4. Pot magnet as claimed in claim 3,
wherein the threaded bolt has a radially thickened region extending between the external threads on the first and the second ends of the threaded bolt, and wherein the thickened region is bounded on each end thereof by a respective axially effective abutment flange.

5. Pot magnet as claimed in claim 2,
wherein the bolt is configured as a screw that passes through the pot base, wherein the screw is supported by a screw head, disposed on the first end of the screw, against an axially outer surface of the screw head, and wherein the screw has a threaded second end screwed into an internal thread of the pole plate corresponding to the threaded second end.

6. Pot magnet as claimed in claim 2,
wherein the bolt comprises a hollow cylindrical spacer sleeve that passes through the permanent magnet body without contact to the permanent magnet body and is supported by the first end of the bolt against the pot base and by the second end of the bolt against the pole plate.

7. Pot magnet as claimed in claim 2,
wherein the bolt passes through a hollow cylindrical spacer sleeve which axially surrounds the permanent magnet body without contact to the permanent magnet body and is supported by the first end of the bolt against the pot base and by the second end of the bolt against the pole plate.

8. Pot magnet as claimed in claim 2,
further comprising a plurality of eccentrically arranged spacer pins that pass through the permanent magnet body without contact to the permanent magnet body and are supported by first ends thereof against the pot base and by second ends thereof against the pole plate.

* * * * *